US010005326B2

(12) United States Patent
So et al.

(10) Patent No.: US 10,005,326 B2
(45) Date of Patent: Jun. 26, 2018

(54) METHOD AND SYSTEM FOR EVALUATING TIRE STATE AND TIRE CONFIGURED FOR SAME

(71) Applicant: HANKOOK TIRE CO., LTD., Seoul (KR)

(72) Inventors: Soon Hong So, Daejeon (KR); Jeong Mu Heo, Daejeon (KR); Jae Wook Ihm, Daejeon (KR); Jeong Heon Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 0 days. days.

(21) Appl. No.: 15/454,984

(22) Filed: Mar. 9, 2017

(65) Prior Publication Data

US 2017/0326926 A1    Nov. 16, 2017

(30) Foreign Application Priority Data

May 11, 2016    (KR) .......................... 10-2016-0057587

(51) Int. Cl.
*B60C 23/00* (2006.01)
*B60C 23/02* (2006.01)
*B60C 23/04* (2006.01)

(52) U.S. Cl.
CPC .......... *B60C 23/02* (2013.01); *B60C 23/0401* (2013.01); *B60C 23/0474* (2013.01); *B60C 23/0481* (2013.01)

(58) Field of Classification Search
CPC .................................. H04B 1/44; H03F 3/211
See application file for complete search history.

(56) References Cited

U.S. PATENT DOCUMENTS

| | | | | |
|---|---|---|---|---|
| 2009/0072959 A1* | 3/2009 | Matsumura | ......... | B60C 23/0408 340/447 |
| 2014/0306815 A1* | 10/2014 | Henriet | ............... | B60C 23/0455 340/447 |
| 2014/0368327 A1* | 12/2014 | Darrer | .............. | G06K 19/07764 340/447 |

* cited by examiner

*Primary Examiner* — Fabricio R Murillo Garcia
(74) *Attorney, Agent, or Firm* — Knobbe, Martens, Olson & Bear LLP (57) ABSTRACT

The disclosed technology generally relates to tires, and more particularly to a method of and a smart tire system for evaluating a state of a tire, and providing an alarm, and to a smart tire configured for the method and the system. In one aspect, a method includes determining whether an abnormality or a problem exists in a state of a tire, by processing a tire state value from a TPMS sensor. Processing the tire state can be carried out by a sensor processor and/or a sensor information processor. The method additionally includes providing an alarm to a user, e.g., a driver. The method additionally includes verifying the determination of whether there is an abnormality or a problem. Thus, the disclosed method includes determining the state of a tire and providing an alarm, where the alarm has high reliability because it is generated based on examination of various parameters of the tire state, including, e.g., pressure, temperature and/or acceleration. The disclosed technology additionally relates to a system and a smart tire configured to implement the method. The method, the system and the tire according to embodiments may be improvements over existing methods, systems and tires.

23 Claims, 3 Drawing Sheets

METHOD AND SYSTEM FOR EVALUATING TIRE STATE AND TIRE CONFIGURED FOR SAME

CROSS-REFERENCE TO RELATED APPLICATION

This application claims priority to and the benefit of Korean Patent Application No. 10-2016-0057587, filed on May 11, 2016, the disclosure of which is incorporated herein by reference in its entirety.

BACKGROUND OF THE INVENTION

Field of the Invention

The disclosed technology generally relates to tires, and more particularly to a method and a smart tire system for evaluating a state of a tire and providing an alarm, and a tire configured for the method and the system.

Description of the Related Art

Recently, systems that process data such as internal air pressure, temperature, and acceleration of tires collected by a sensor module and provide various information to a driver have been developed and commonly used. Such systems are sometimes referred to as a tire pressure monitoring systems (TPMS). A TPMS can be configured to measure various state parameters of a tire, such as the pressure, to provide relevant information to a user, e.g., the driver, and to raise an alarm for recommending predetermined action(s).

An apparatus for giving a warning of a tire defect has been disclosed in Korean Patent Application Publication No. 2014-0067431 having the title "Apparatus for Warning of Tire Defect" (hereinafter '431 application). The apparatus disclosed in the '431 application includes a sensor unit that is composed of a plurality of sensors disposed at predetermined positions inside a tire for sensing tension in the tire, and a control unit that calculates an average and a peak of signals from the sensor unit and determines the state of a tire with reference to a table comparing an average and a peak stored in the early stage of driving with tension in a safety range of tires. While some prior art including the '431 application discloses methods of processing tension values measured by a plurality of sensors, they do not disclose methods of processing values measured by sensors of a TPMS, including pressure, acceleration and/or temperature. Further, the prior art does not disclose verifying the results of determining the states of a tire state at various points within the method. Thus, there is a need for a method of and a smart tire system, for processing values measured by a plurality of sensors of a TPMS, including pressure, acceleration and/or temperature, and for verifying the results of determining the states of a tire at various points within the method.

SUMMARY OF THE INVENTION

The technical subjects to implement in the present invention are not limited to the technical problems described above and other technical subjects that are not stated herein will be clearly understood by those skilled in the art from the following specifications.

An aspect of the disclosed technology provides a method of determining a tire state and providing an alarm using a smart tire system including a tire equipped with a TPMS sensor unit, which includes a TPMS sensor and a sensor processor, and a sensor information processor, the method including: a) generating discrete time-series tire state signals by measuring state variables inside the tire by means of the TPMS sensor; b) determining whether there is a problem with samples of the discrete time-series tire state signals by comparing the samples of the discrete time-series tire state signals with a problem determination reference by means of the sensor processor; c) generating a first alarm for a driver by means of the sensor processor, when it is determined that there is an abnormal sample in the samples of the discrete time-series tire state signals in the step b); d) transmitting the discrete time-series tire state signals to the sensor information processor by means of the TPMS sensor unit; e) determining whether one or more of n samples have a problem by sequentially comparing the n samples right after an abnormal sample with a problem determination reference, by means of the sensor information processor; f) generating a second alarm for the driver by means of the sensor information processor, when it is determined that one or more of the n samples have a problem in the step e); and g) removing the first alarm by means of the sensor information processor, when it is determined that all of the n samples do not have a problem in the step e), in which in the discrete time-series tire state signals transmitted to the sensor information processor, the step e) and the following steps are performed on samples after the n sample determined having no problem in the step g).

Another aspect of the disclosed technology provides a method of determining a tire state and providing an alarm using a smart tire system including a tire equipped with a TPMS sensor unit, which includes a TPMS sensor, and a sensor information processor, the method including: i) generating discrete time-series tire state signals by measuring state variables inside the tire by means of the TPMS sensor; ii) transmitting the discrete time-series tire state signals to the sensor information processor; iii) determining whether there is a problem with samples of the discrete time-series tire state signals by comparing the samples of the discrete time-series tire state signals with a problem determination reference by means of the sensor information processor; iv) generating a first alarm for a driver by means of the sensor information processor, when it is determined that there is an abnormal sample in the samples of the discrete time-series tire state signals in the step iii); v) determining whether one or more of n samples have a problem by sequentially comparing n samples right after an abnormal sample determined as having a problem in the step iv) with a problem determination reference, by means of the sensor information processor; vi) generating a second alarm for the driver by means of the sensor information processor, when it is determined that one or more of the n samples have a problem in the step v); vii) removing the first alarm by means of the sensor information processor, when it is determined that all of the n samples do not have a problem in the step v); and viii) performing the step iii) and the following steps for samples after the n samples determined as having no problem in the step vii).

Another aspect of the disclosed technology provides a method of determining a tire state and providing an alarm using a smart tire system including a tire equipped with a TPMS sensor unit, which includes a TPMS sensor and a sensor processor, and a sensor information processor, the method including: A) generating discrete time-series tire state signals by measuring state variables inside the tire by means of the TPMS sensor; B) determining whether there is a problem with samples of the discrete time-series tire state signals by comparing the samples of the discrete time-series tire state signals with a problem determination reference by means of the sensor processor; C) generating a first alarm for a driver by means of the sensor processor, when it is determined that there is an abnormal sample in the samples of the discrete time-series tire state signals in the step B); D) determining whether one or more of n samples have a problem by sequentially comparing the n samples right after an abnormal sample with a problem determination reference, by means of the sensor processor; E) generating a second alarm for the driver by means of the sensor processor, when it is determined that one or more of the n samples have a problem in the step D); F) removing the first alarm by means of the sensor processor, when it is determined that all of the n samples do not have a problem in the step D); and G) transmitting the discrete time-series tire state signals to the sensor information processor by means of the TPMS sensor unit.

Another aspect of the disclosed technology provides a system for determining a tire state that uses the method of determining a tire state and providing an alarm and includes a TPMS sensor unit disposed on an inner liner of the tire and a sensor information processor receiving and processing information from the TPMS sensor unit.

Another aspect of the disclosed technology provides a smart tire using the system for determining a tire state, and a vehicle equipped with the smart tire.

DETAILED DESCRIPTION OF THE PREFERRED EMBODIMENT

The disclosed technology is described hereafter with reference to the accompanying drawings. However, the present invention may be achieved in various different ways and is not limited to the embodiments described herein. In the accompanying drawings, portions not related to the description may be omitted to more clearly describe the present invention, and similar reference numerals will be used to describe similar portions throughout the present specification.

Throughout this specification, a case in which any one part is connected with (in contact with, coupled to, and combined with) the other part includes a case in which the parts are directly connected with each other and a case in which the parts are indirectly connected with each other with other component interposed therebetween. Further, unless explicitly described otherwise, "comprising" any components will be understood to imply the inclusion of other components rather than the exclusion of any other components.

Terms used in the present specification are used only in order to describe specific exemplary embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The disclosed technology relates to a method which includes determining whether an abnormality or a problem exists in a state of a tire, by processing a tire state value from a TPMS sensor. Processing the tire state can be carried out by a sensor processor and/or a sensor information processor. The method additionally includes providing an alarm to a user, e.g., a driver. The method additionally includes verifying the determination of whether there is an abnormality or a problem. Thus, the disclosed method includes determining the state of a tire and providing an alarm, where the alarm has high reliability because it is generated based on examination of various parameters of the tire state, including, e.g., pressure, temperature and/or acceleration. The disclosed technology additionally relates to a system and a smart tire configured to implement the method. The method, the system and the tire according to embodiments may be improvements over existing methods, systems and tires. In the following, these and other aspects of the disclosed technology are described in detail with reference to the accompanying drawings.

Figure 1:
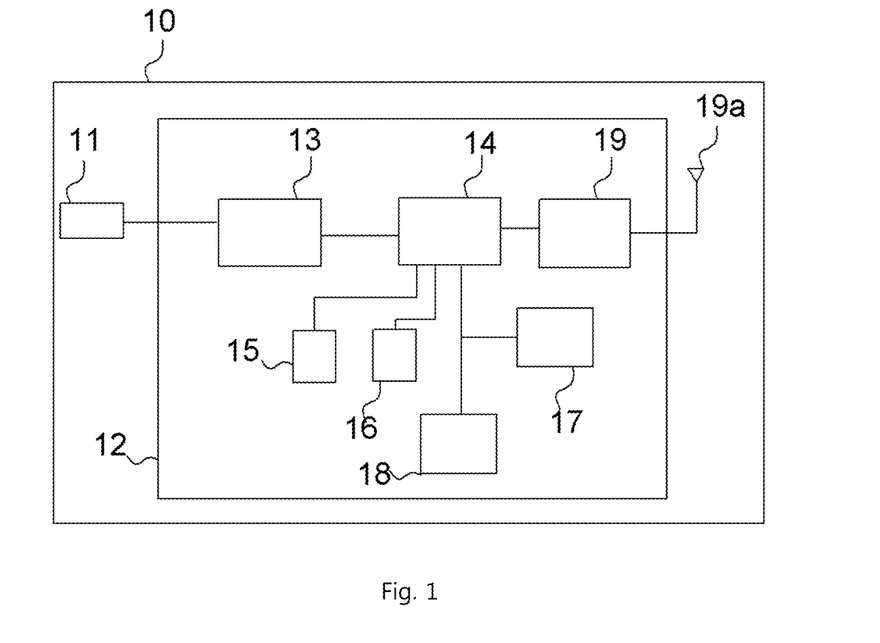
FIG. 1 is a schematic diagram of a tire pressure management system (TPMS) sensor unit of a smart tire system, according to embodiments of the disclosed technology.

Referring to FIG. 1, a TPMS sensor unit 10 of a smart tire system, according to embodiments includes a TPMS sensor 11 and a sensor processor 12.

The TPMS sensor unit 10 may be operated in relation to driving of a vehicle and for example, when a vehicle is not driven, it may be placed in a power-saving mode. The TPMS sensor unit 10 may be disposed inside or on a tire, e.g., on the inner liner of a tire. The TPMS sensor unit may be installed in various ways, such as, being inserted in a pocket integrated with/attached to the inner liner of a tire or being held by tension of a band having both ends integrated with/attached to the inner liner, but it may also be integrated with an air injection valve.

The sensor processor 12 may include a read-only memory (ROM) 17, a random access memory (RAM), a wireless communication module and an antenna (including RF/LF or Bluetooth type) for a sensor signal transmitter 19, an oscillator 15, a clock generator 16, and an analog-digital converter (ADC) 13 that are arranged around and electrically connected to be communicatively coupled to an MCU 14. These elements may be mounted on a circuit board to be packaged in a single module (chip). However, the disclosed technology is not limited thereto, and the elements may be arranged in multiple modules.

The TPMS sensor 11 is configured to sense physical quantities including internal temperature, pressure, and/or acceleration of a tire. The TPMS sensor is configured to measures these and other physical quantities and to generate electrical signals corresponding to the measured physical quantities.

Still referring to FIG. 1, the sensor processor 12 may include a microprocessor (controller) unit 14 configured to generate discrete time-series tire state signals. Further, the TPMS sensor unit 10 may include the ADC 13. The ADC 13 is configured to convert the electrical signals generated by the TPMS sensor 11 into digital signals so that the sensor processor 12 can process the digital signals.

The sensor processor 12 may include the oscillator 15 and the clock generator 16, in which the oscillator 15 may be a crystal resonator (rectifier), without being limited thereto. The clock generator 16 generates a sampling clock signal and the oscillator 15 generates an oscillation signal in response to the sampling clock signal. The sampling clock signal synchronizes the operation of the oscillator 15 such as a rectifier and a sensor behavior, and accordingly, tire state signals (tire state data and tire state information) in the form of discrete time-series signals of the samples can be synchronized.

The oscillation signal operated in accordance with the clock frequency can include a pulse signal and can have the same pulse frequency as that of the clock frequency, and the measuring cycle of the TPMS sensor 11 can be the same as the pulse frequency of the oscillation signal. In other words, when a predetermined clock frequency is changed, the measuring cycle of the TPMS sensor can be changed accordingly, and when there is an oscillation signal, the TPMS sensor 11 may start measuring. However, an example of receiving a forcing signal through the sensor information processor (receiver) 20 and making the TPMS sensor 11 start measuring is not excluded from the embodiments, as described below.

Further, the sensor processor 12 may include the ROM 17 keeping a way or a condition for data conversion, wireless data transmission, and temporal data storage of discrete time-series tire state signals, or a measurement sampling cycle.

Further, the sensor processor 12 includes the sensor signal transmitter 19, and particularly, when the sensor signal transmitter 19 operates in an RF type, the sensor signal transmitter 19 may include a crystal oscillator, a voltage control oscillator, an RF output amplifier, and a phase locked loop. Further, the sensor processor 12 may include an LF receiver, which may be designed to consume a small amount of power in the TPMS while receiving a low-frequency signal for local communication.

The power for the TPMS sensor unit 10 may be provided by a battery, e.g., a mercury battery, a Li-ion battery, etc., having various shapes such as a coin shape and a bar shape, or an energy harvesting element, but is not limited thereto. Further, the TPMS sensor unit 10 may further include a power management module for managing the power and, when a vehicle is stopped of idling, the power management module can perform a function of controlling the TPMS sensor unit 10 to consume minimum energy.

Figure 2:
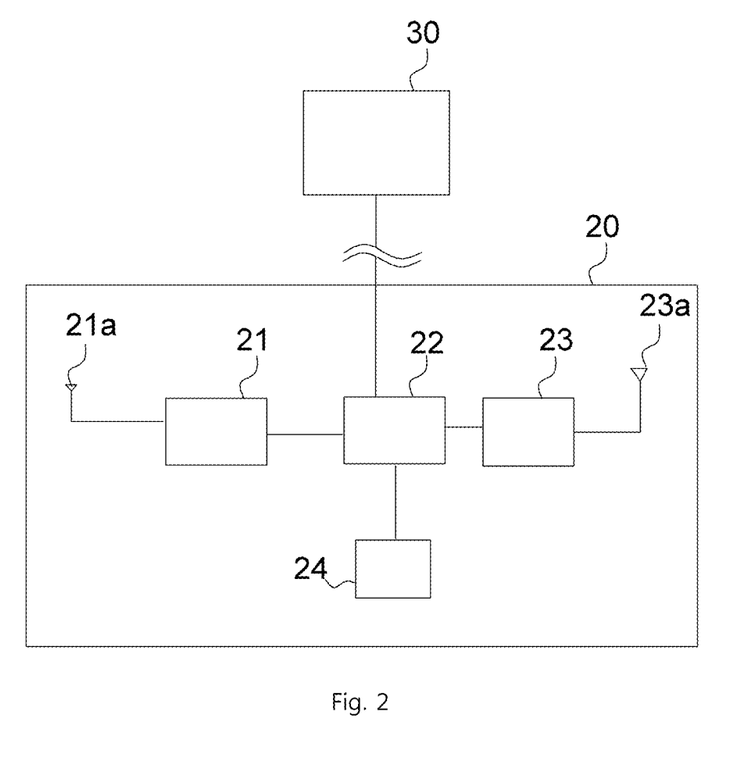
FIG. 2 is a schematic diagram of a sensor information processor of a smart tire system, according to embodiments of the disclosed technology.

Referring to FIG. 2, a sensor information processor 20 of a smart tire system, which is sometimes called a receiver, may be disposed at predetermined position inside a vehicle, on a vehicle, or on the under body of a vehicle, whose position can be selected in consideration of the reception efficiency of a signal from the TPMS sensor unit 10 in each tire.

The sensor information processor 20 includes not only a data processor 22 that processes data from the TPMS sensor unit 10, but a signal receiver 21 and an antenna 21*a* that can receive any one of RF, LF, Bluetooth, and BLE types of communication signals, among other types of communication signals, for wireless communication with the TPMS sensor unit 10. Further, it may include a signal transmitter 23 and an antenna 23*a* for transmitting one or more of Bluetooth, WiFi, LTE, Wibro, and 3G types of communication signals, among other types of communication signals, for communication with an external server 40. Further, the sensor information processor 20 may include the MCU 14 that processes tire state signals from the TPMS sensor unit 10. In particular, when the signal receiver 21 uses Bluetooth communication, it is possible to transmit information not to a display unit 30, but instead to a smart device of a user, thereby providing the information to a driver.

The display unit 30, which is an interface device for providing a driver with a first warning and a second warning etc. that are transmitted from the TPMS sensor unit 10 or the sensor information processor 20, can provide information to a driver using one or more of visual, aural, tactual, and olfactory means. The display unit 30 may be disposed close to the sensor information processor 20 or may be disposed within the visual field of a driver (for example, around the center fascia or the dashboard) so that the driver can easily see the information on the display unit 30, but is not limited thereto. Further, the display unit 30 and the sensor information processor 20 can be connected through a wire or wirelessly to send information therebetween.

Hereinafter, a method of determining whether there is a problem with a tire and providing an alarm of the disclosed technology is described.

Embodiment 1

This embodiment uses a smart tire system including a tire equipped with the TPMS sensor unit 10, which includes the TPMS sensor and the sensor processor 12, and the sensor information processor 20, in which the TPMS sensor unit 10 generates a first alarm by primarily determining whether there is an abnormality or a problem associated with the state of a tire, and the sensor information processor 20 (receiver) generates a second alarm by secondarily determining whether there is a problem with the tire.

Each step is described hereafter.

a) The TPMS sensor 11 generates discrete time-series tire state signals by measuring state variables inside the tire. The state variables include pressure, temperature, and acceleration. The state variables measured by the TPMS sensor 11 are input as electrical signals to the ADC 13 and a corresponding output is generated as discrete time-series tire state signals through the MCU 14.

b) The sensor processor 12 determines whether there is a problem with one or more samples of the discrete time-series tire state signals by comparing the sample(s) of the discrete time-series tire state signals with a problem determination reference. The problem determination reference is a set of predetermined data to be directly compared with the samples of the discrete time-series tire state signals and may be recorded on the ROM 17 in the TPMS sensor module, but is not limited thereto.

It is possible to determine whether there is an abnormality or a problem with the discrete time-series tire state signals by comparing at least one of temperature, pressure, and acceleration with the value or range of the problem determination reference. For example, the problem may be a case when the acceleration is a reference value or more, a case when the measured temperature abnormally increases over a reference vale, and a case when the pressure rapidly increases or drops out of a reference range, but is not limited to these cases. Obviously, combining two or more of the physical quantities can be included in the determination.

c) When it is determined that there is an abnormal sample in the samples of the discrete time-series tire state signals in the step b), the sensor processor 12 can generate a first alarm for a driver. The first alarm may be transmitted to the display unit 30 or to a smart device of the driver/a passenger. The first alarm may be a warning about an abnormality or a problem associated with the pressure, temperature, and acceleration of a tire or an advice to check the state of a tire, but is not limited thereto.

Further, in the step c), the sensor processor 12 may further perform a function of keeping only abnormal samples and samples within a predetermined range before and after the abnormal samples in the memory 18 of the TPMS sensor unit 10. This is for analyzing an accident and the samples to be kept may be, for example, samples within ranges of 30 seconds before and 10 seconds after the time when an abnormal sample is generated. The memory 18 of the TPMS sensor unit 10 has a limit in capacity, so when there is no memory left, it is possible to rewrite the latest data over the section of the oldest data.

d) The TPMS sensor unit 10 transmits the discrete time-series tire state signals to the sensor information processor 20. It is possible to use RF/LF/Bluetooth/BLE type for the transmission.

The sensor information processor 20 may include an information storage 24 for keeping the discrete time-series tire state signals transmitted in the step d). The information storage 24 may be an RAM, but may be any suitable storage configured to store information. The sensor information processor 20 can keep only the samples within predetermined ranges before and after the latest sample of the samples of the discrete time-series tire state signals transmitted in the step d) in the information storage 24. Accordingly, the information can be updated with the latest information, whereby it is possible to overcome the limit of the capacity of the information storage 24. For example, it may be possible to keep samples transmitted within 5 minutes before and 2 minutes after the latest sample, and as the time passes, the information about the oldest sample can be rewritten with the latest information (e.g., first in, first out).

Figure 3:
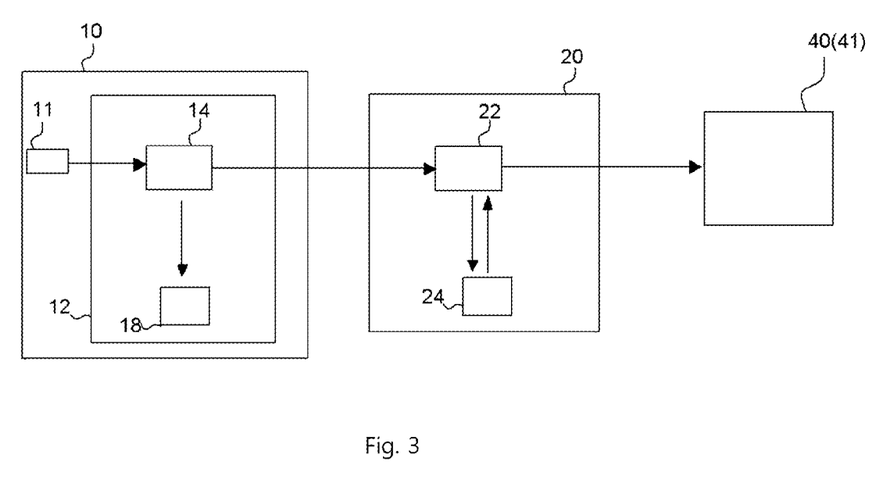
FIG. 3 is a schematic diagram of a smart tire system including servers (an external server and a problem management server), according to embodiments of the disclosed technology.

The sensor information processor 20 may further perform a function of transmitting the discrete time-series tire state signals in the information storage 24 to the external server 40. This is for keeping the tire state information in the external server in a normal driving mode (without an abnormal sample) to manage history information for each vehicle and each tire.

The sensor information processor 20 can display the current tire state by transmitting data to the display unit 30 with predetermined intervals (for example, 5 minutes) in a normal driving mode, and it can provide information to the driver only when the data pressure etc. is out of a reference range after the vehicle is stopped.

Keeping the tire state information in the information storage 24 is not only for performing the following step e) and for making preparation for transmitting the information to the external server 40, which is described below, but for ensuring information for finding out the reason of a problem such as failure of transmission to the external server 40 when a second alarm is not generated due to an accident or a problem with the sensor information processor 20.

e) The sensor information processor 20 sequentially compares n samples right after an abnormal sample with a problem determination reference, thereby determining whether one or more of the n samples have a problem. This is for verifying and enhancing the primary determination on whether there is a problem performed by the sensor processor 12 of the TPMS sensor unit 10, in which a so-called 'smart sensing algorithm (an accident determination algorithm) is performed. The 'n' may be set as 2 or more (for example, 3) to minimize possibility of an error in the problem determination. The pattern of the problem determination may be a case when one of the n samples has a problem (for example, when n is 3, one of three samples right after an abnormal sample has a problem), a case when two or more or less than n−1 samples have a problem (for example, when n is 3, the same right after an abnormal sample has a problem and the next sample is normal, but the next sample of the normal sample has a problem, so a total two of three samples have a problem), or a case when all of the n samples have a problem (all of three samples after an abnormal sample have a problem).

f) When it is determined that one or more of n samples have a problem in the step e), the sensor information processor 20 generates and provides a second alarm for a driver. The second alarm may be provided through the display unit 30 or a medium such as a smart device. In this case, it is possible to ensure that there is a high possibility of a problem in the tire, so the second alarm may be different from the first alarm. For example, it is possible to increase (visual, aural, and tactual) level of the alarm that is transmitted to the driver. Alternatively, it is possible to provide a message for advising the driver to stop the vehicle or to provide information about a repair shop, a resting place, or a specialty store of tire around the place by finding out the current location using a GPS etc.

The sensor information processor 20 may further perform a function of permanently recording the information about the abnormal sample in the information storage 24. As described above, the tire state information is continuously updated and the latest one is kept in a normal driving mode, but an abnormal sample is permanently kept to be used as an object to be analyzed. The information about an abnormal sample may be kept in another table different from that of normal samples, but may be kept and managed with the field of additional flag information (Y/N for a problem) in a table relating to the information about the normal samples.

Further, when it is determined that one or more of n samples have a problem in the step f), the sensor information processor 20 may perform a function of further recording the information about all of the n samples on the information storage 24, and may further perform a function of permanently storing the information about an abnormal sample and samples within a predetermined range before and after the abnormal sample in the information storage 24. For example, it may be possible to permanently keep the information about samples in the range of 1 minute and 30 seconds before and 30 seconds after the time when the first abnormal sample is generated.

Referring to FIG. 3, the sensor information processor 20 can transmit the information about the abnormal sample to a problem management server 41.

Further, when it is determined that one or more of n samples have a problem in the step f), a function of additionally transmitting the information about all of the n samples or of transmitting the information about an abnormal sample and samples within a predetermined range before and after the abnormal sample to the problem management server 41. The problem management server 41 may be the same as the external server 40.

g) When it is determined that all of the n samples do not have a problem in the step e), the sensor information processor 20 removes the first alarm. In this case, the second alarm is not generated and the sensor information processor 20 returns to the normal driving mode. However, in this case, an abnormal sample is kept in the information storage 24 and the location where the problem is generated (GPS information) may be additionally recorded. Further, the information about the abnormal sample may be transmitted to the problem management server 41.

The problem management server 41 or the external server 40 may be a server that is managed by the tire manufacturer, in which the tire manufacturer may determine whether to replace a tire using the received information about the abnormal sample, or when an accident has happened, the tire manufacturer may use the information to analyze the accident.

On the basis of the discrete time-series tire state signals from the sensor information processor 20, this process is performed from the step e) on the samples after the n samples determined as not having a problem in the step g).

Embodiment 2

This embodiment uses a smart tire system including a tire equipped with the TPMS sensor and the sensor information processor 20, in which the sensor information processor 20 determines whether there is a problem with the tire (primarily determines the tire state and additionally determines n samples) and generates a first alarm and a second alarm.

Hereafter, each step is described except for the repetition of Embodiment 1.

i) The TPMS sensor generates discrete time-series tire state signals by measuring state variables inside the tire.

ii) The discrete time-series tire state signals are transmitted to the sensor information processor 20.

iii) The sensor information processor 20 determines whether there is a problem with samples of the discrete time-series tire state signals by comparing the samples of the discrete time-series tire state signals with a problem determination reference.

iv) When it is determined that there is an abnormal sample in the samples of the discrete time-series tire state signals in the step iii), the sensor information processor 12 generates a first alarm for a driver.

v) The sensor information processor 20 sequentially compares n samples right after the sample determined as having a problem in the step iv) with a problem determination reference, thereby determining whether one or more of the n samples have a problem.

vi) When it is determined that one or more of the n samples have a problem in the step v), the sensor information processor 20 generates a second alarm for the driver.

vii) When it is determined that all of the n samples do not have a problem in the step v), the sensor information processor 20 removes the first alarm.

However, the process after the step iii) is performed on the samples after the n sample determined having no problem in the step vii).

Embodiment 3

This embodiment uses a smart tire system including a tire equipped with the TPMS sensor unit 10, which includes the TPMS sensor and the sensor processor 12, and the sensor information processor 20, in which the sensor information processor 20 determines whether there is a problem with the tire (primarily determines the tire state and additionally determines n samples) on the basis of information from the TPMS sensor unit 10, and generates a first alarm and a second alarm.

Hereafter, each step is described except for the repetition of Embodiment 1.

A) The TPMS sensor generates discrete time-series tire state signals by measuring state variables inside the tire.

B) The sensor processor 12 determines whether there is a problem with samples of the discrete time-series tire state signals by comparing the samples of the discrete time-series tire state signals with a problem determination reference.

C) When it is determined that there is an abnormal sample in the samples of the discrete time-series tire state signals in the step B), the sensor processor 12 generates a first alarm for a driver.

D) The sensor processor 12 sequentially compares n samples right after an abnormal sample with a problem determination reference, thereby determining whether one or more of the n samples have a problem.

E) When it is determined that one or more of the n samples have a problem in the step D), the sensor processor 12 generates a second alarm for the driver.

F) When it is determined that all of the n samples do not have a problem in the step D), the sensor processor 12 removes the first alarm.

G) The TPMS sensor unit 10 transmits the discrete time-series tire state signals to the sensor information processor 20.

The system for determining a tire state of the present invention performs a function of determining whether there is a problem in a tire and providing an alarm and the function can be achieved through the above description. The system may include a TPMS sensor unit 10 that is disposed on an inner liner of a tire, a sensor information processor 20 that receives and processes information from the TPMS sensor unit 10, and a display unit 30 that transmits an alarm from the sensor information processor 20 or the TPMS sensor unit 10 to a driver.

The smart tire of the present invention is equipped with the system for determining a tire state and can be mounted on various vehicles.

According to the present invention, it is possible achieve a first effect of transmitting information about whether there is a problem with a tire to a driver by determining a tire state in real time, and of providing an alarm, a second effect of checking reliability of the alarm by performing secondary verification on the initial determination, and a third effect of providing various items of information about the tire state to the driver by making the first alarm and the second alarm different, for example, by providing a simple notice through the first alarm and an advice of stopping the vehicle to the driver through the second alarm.

The above description is an example of the present invention and those skilled in the art may understand that the present invention may be easily modified in other ways without changing the necessary characteristics or the spirit of the present invention. Therefore, it should be understood that the exemplary embodiments are not limiting but illustrative in all aspects. For example, the single components may be divided, respectively, and the separate components may be combined.

The scope of the present invention is defined by the following claims, and all of changes and modifications obtained from the meaning and range of claims and equivalent concepts should be construed as being included in the scope of the present invention.

What is claimed is:

1. A method of determining a tire state and providing an alarm using a smart tire system, wherein the smart tire system comprises a tire equipped with a tire pressure monitoring system (TPMS) sensor unit, the TPMS sensor unit including a TPMS sensor and a sensor processor, and a sensor information processor, the method comprising the following steps:

(a) generating discrete time-series tire state signals by measuring state variables inside the tire using the TPMS sensor;

(b) determining, using the sensor processor, whether there is a problem associated with one or more samples of the discrete time-series tire state signals by comparing the samples of the discrete time-series tire state signals against a problem determination reference;

(c) generating a first alarm to a driver using the sensor processor upon making a determination that there is an abnormal sample in the samples of the discrete time-series tire state signals in the step (b);

(d) transmitting the discrete time-series tire state signals to the sensor information processor using the TPMS sensor unit;

(e) determining whether one or more of n samples have a problem by sequentially comparing the n samples immediately after an abnormal sample with a problem determination reference, using the sensor information processor;

(f) generating a second alarm for the driver using the sensor information processor, upon making a determination that one or more of the n samples have a problem in the step (e); and (g) removing the first alarm using the sensor information processor, upon making a determination that none of the n samples have a problem in the step (e), wherein in the discrete time-series tire state signals transmitted to the sensor information processor, the steps (e) and (f) are performed on the n sample after making the determination that that none of the n samples have a problem in the step (g).

2. The method of claim 1, wherein the step (c) further comprises, using the sensor processor, keeping only the abnormal sample and samples within a predetermined range before and after the abnormal sample in a memory included in the TPMS sensor unit.

3. The method of claim 1, wherein the sensor information processor includes an information storage, wherein the method further comprises storing the discrete time-series tire state signals transmitted in the step (d).

4. The method of claim 3, further comprising, using the sensor information processor transmitting the discrete time-series time state signals stored in the information storage to an external server.

5. The method of claim 3, further comprising, using the sensor information processor, keeping only a sample within a predetermined range before and after the latest sample of the discrete time-series tire state signals transmitted in the step (d).

6. The method of claim 3, further comprising, using the sensor information processor, permanently recording information associated with the abnormal sample in the information storage.

7. The method of claim 6, further comprising, using the sensor information processor, permanently recording information including all of the n samples in the information storage, upon making a determination that one or more of the n samples have a problem in the step (f).

8. The method of claim 6, further comprising, using the sensor information processor, permanently keeping information associated with the abnormal sample and samples within a predetermined range before and after the abnormal sample in the information storage, upon making a determination that one or more of the n samples have a problem in the step (f).

9. The method of claim 1, further comprising, using the sensor information processor, transmitting information associated with the abnormal sample to a problem management server.

10. The method of claim 9, further comprising, using the sensor information processor, transmitting information associated with the abnormal sample and samples within a predetermined range before and after the abnormal sample to the problem management server, upon making a determination that one or more of the n samples have a problem in the step (f).

11. A method of determining a tire state and providing an alarm using a smart tire system, wherein the smart tire system comprises a tire equipped with a tire pressure monitoring system (TPMS) sensor unit, the TPMS sensor unit including a TPMS sensor and a sensor processor, and a sensor information processor, the method comprising the following steps:

i) generating discrete time-series tire state signals by measuring state variables inside the tire using the TPMS sensor;

ii) transmitting the discrete time-series tire state signals to the sensor information processor;

iii) determining, using the sensor information processor, whether there is a problem with samples of the discrete time-series tire state signals by comparing the samples of the discrete time-series tire state signals against a problem determination reference;

iv) generating a first alarm to a driver using the sensor information processor, when it is determined that there is an abnormal sample in the samples of the discrete time-series tire state signals in the step iii);

v) determining whether one or more of n samples have a problem by sequentially comparing n samples right after an abnormal sample determined as having a problem in the step iv) with a problem determination reference, using the sensor information processor;

vi) generating a second alarm for the driver using the sensor information processor, when it is determined that one or more of the n samples have a problem in the step v);

vii) removing the first alarm using the sensor information processor, when it is determined that all of the n samples do not have a problem in the step v); and viii) performing the step iii) to vi) for samples after the n samples are determined as having no problem in the step vii).

12. The method of claim 11, wherein the sensor information processor includes an information storage for keeping the discrete time-series tire state signals transmitted in the step ii).

13. The method of claim 12, further comprises, using the sensor information processor, transmitting the discrete time-series time state signals kept in the information storage to an external server.

14. The method of claim 12, further comprising, using the sensor information processor, keeping only a sample within a predetermined range before and after the latest sample of the discrete time-series tire state signals transmitted in the step ii).

15. The method of claim 12, further comprising, using the sensor information processor, permanently recording information associated with the abnormal sample in the information storage in the step iv).

16. The method of claim 15, further comprising, using the sensor information processor, permanently recording information associated with the n samples on the information storage when it is determined that one or more of the n samples have a problem in the step vi).

17. The method of claim 15, further comprising, using the sensor information processor, permanently keeping information associated with the abnormal sample and samples within a predetermined range before and after the abnormal sample in the information storage, when it is determined that one or more of the n samples have a problem in the step vi).

18. The method of claim 11, further comprising, using the sensor information processor, transmitting information associated with the abnormal sample to a problem management server in the step iv).

19. The method of claim 18, further comprising, using the sensor information processor, transmitting information associated with the abnormal sample and samples within a predetermined range before and after the abnormal sample to the problem management server, when it is determined that one or more of the n samples have a problem in the step vi).

20. A method of determining a tire state and providing an alarm using a smart tire system, wherein the smart tire system comprises a tire equipped with a tire pressure monitoring system (TPMS) sensor unit, the TPMS sensor unit including a TPMS sensor and a sensor processor, and a sensor information processor, the method comprising the following steps:

A) generating discrete time-series tire state signals by measuring state variables inside the tire using the TPMS sensor;

B) determining, using the sensor processor, whether there is a problem with samples of the discrete time-series tire state signals by comparing the samples of the discrete time-series tire state signals with a problem determination reference;

C) generating a first alarm to a driver using the sensor processor, when it is determined that there is an abnormal sample in the samples of the discrete time-series tire state signals in the step B);

D) determining whether one or more of n samples have a problem by sequentially comparing the n samples right after an abnormal sample with a problem determination reference, using the sensor processor;

E) generating a second alarm for the driver using the sensor processor, when it is determined that one or more of the n samples have a problem in the step D);

F) removing the first alarm using the sensor processor, when it is determined that all of the n samples do not have a problem in the step D); and G) transmitting the discrete time-series tire state signals to the sensor information processor using the TPMS sensor unit.

21. A system for determining a tire state and providing an alarm, the system comprising:

a tire pressure monitoring system (TPMS) sensor unit configured to be disposed on an inner liner of a tire, the TPMS sensor unit including a TPMS sensor and a sensor processor;

a sensor information processor configured to receive and process information from the TPMS sensor unit; and a display unit configured to transmit information from the sensor information processor or the TPMS sensor unit to a driver, wherein the system, by performing the following steps, is configured to:

(a) generate discrete time-series tire state signals by measuring state variables inside the tire using the TPMS sensor;

(b) determine, using the sensor processor, whether there is a problem associated with one or more samples of the discrete time-series tire state signals by comparing the samples of the discrete time-series tire state signals against a problem determination reference;

(c) generate a first alarm to a driver using the sensor processor upon making a determination that there is an abnormal sample in the samples of the discrete time-series tire state signals in the step (b);

(d) transmit the discrete time-series tire state signals to the sensor information processor using the TPMS sensor unit;

(e) determine whether one or more of n samples have a problem by sequentially comparing the n samples immediately after an abnormal sample with a problem determination reference, using the sensor information processor;

(f) generate a second alarm for the driver using the sensor information processor, upon making a determination that one or more of the n samples have a problem in the step (e); and (g) remove the first alarm using the sensor information processor, upon making a determination that none of the n samples have a problem in the step (e), wherein in the discrete time-series tire state signals transmitted to the sensor information processor, the steps (e) and (f) are performed on the n samples after making the determination that that none of the n samples have a problem in the step (g).

22. The system of claim 21, further comprising the tire.

23. A vehicle, comprising:

a tire; and a system for determining a tire state and providing an alarm, the system comprising;

a tire pressure monitoring system (TPMS) sensor unit configured to be disposed on an inner liner of the tire, the TPMS sensor unit including a TPMS sensor and a sensor processor;

a sensor information processor configured to receive and process information from the TPMS sensor unit; and a display unit configured to transmit information from the sensor information processor or the TPMS sensor unit to a driver, wherein the system, by performing the following steps, is configured to:

(a) generate discrete time-series tire state signals by measuring state variables inside the tire using the TPMS sensor;

(b) determine, using the sensor processor, whether there is a problem associated with one or more samples of the discrete time-series tire state signals by comparing the samples of the discrete time-series tire state signals against a problem determination reference;

(c) generate a first alarm to a driver using the sensor processor upon making a determination that there is an abnormal sample in the samples of the discrete time-series tire state signals in the step (b);

(d) transmit the discrete time-series tire state signals to the sensor information processor using the TPMS sensor unit;

(e) determine whether one or more of n samples have a problem by sequentially comparing the n samples immediately after an abnormal sample with a problem determination reference, using the sensor information processor;

(f) generate a second alarm for the driver using the sensor information processor, upon making a determination that one or more of the n samples have a problem in the step (e); and (g) removing the first alarm using the sensor information processor, upon making a determination that none of the n samples have a problem in the step (e), wherein in the discrete time-series tire state signals transmitted to the sensor information processor, the steps (e) and (f) are performed on the n samples after making the determination that that none of the n samples have a problem in the step (a).

* * * * *

UNITED STATES PATENT AND TRADEMARK OFFICE
CERTIFICATE OF CORRECTION

Page 1 of 1

PATENT NO. : 10,005,326 B2
APPLICATION NO. : 15/454984
DATED : June 26, 2018
INVENTOR(S) : So et al.

It is certified that error appears in the above-identified patent and that said Letters Patent is hereby corrected as shown below:

On the Title Page

Column 1, Notice, Line 3, After "0 days." delete "days.".

In the Claims

Column 11, Line 16 (Approx.), in Claim 1, change "n sample" to --n samples--.

Column 11, Line 17 (Approx.), in Claim 1, change "that that" to --that--.

Column 13, Line 38, in Claim 21, change "alarm ," to --alarm,--.

Column 14, Line 15 (Approx.), in Claim 21, change "that that" to --that--.

Column 14, Line 21, in Claim 23, change "comprising;" to --comprising:--.

Column 14, Line 63 (Approx.), in Claim 23, change "that that" to --that--.

Column 14, Line 64 (Approx.), in Claim 23, change "(a)." to --(g).--.

Signed and Sealed this
Fifteenth Day of January, 2019

Andrei Iancu
*Director of the United States Patent and Trademark Office*